United States Patent [19]

Schröder

[11] 3,909,732

[45] Sept. 30, 1975

[54] ELECTRONIC CONTROL UTILIZING ODD OR EVEN COUNTS

[75] Inventor: Wolfgang Schröder, Pforzheim, Germany

[73] Assignee: International Standard Electric Corporation, New York, N.Y.

[22] Filed: May 28, 1974

[21] Appl. No.: 473,542

[30] Foreign Application Priority Data

May 28, 1973 Germany ........................... 2327148

[52] U.S. Cl. ......... 328/152; 178/DIG. 15; 325/390; 328/44; 328/49; 334/8

[51] Int. Cl. ........................................... H03k 17/00

[58] Field of Search ............................ 325/390–393; 178/DIG. 15; 328/44, 49, 152, 153, 105, 106, 154; 307/222 R, 242; 340/168 R; 334/8, 9, 10, 21, 22; 325/464, 465

[56] References Cited

UNITED STATES PATENTS 3,654,557 4/1972 Sakamoto et al. ...................... 334/8

*Primary Examiner*—George H. Libman
*Attorney, Agent, or Firm*—John T. O'Halloran; Menotti J. Lombardi, Jr.; Peter C. Van Der Sluys

[57] ABSTRACT

Ultrasonic remote control device for television receivers. In the one stepping direction only control steps of odd, and in the opposite direction only control steps of even ordinal number are used. During the control operation alternate steps are skipped until an overshoot condition is reached at which point one reverse step brings the control to the desired position. This results in an increased number of steps, in a control of finer graduation and in a rapid reset.

14 Claims, 3 Drawing Figures

ELECTRONIC CONTROL UTILIZING ODD OR EVEN COUNTS

Figure 1:
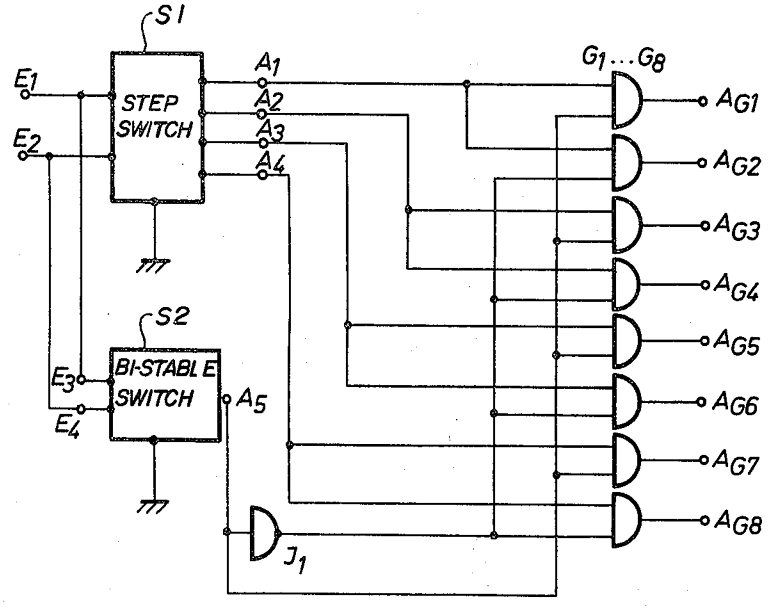

The present invention relates to a system for sequentially controlling the n steps of electronic control elements in radio and television receivers, especially with the aid of ultrasonic remote control devices.

Systems of this kind may be brought into the desired setting position either by a signal of corresponding duration, or else by several short signals which, if so required, may also be encoded, with the systems thereafter being retained in this particular position. Electronic control elements are preferably used for wirebound or wireless remote-control systems, which also employ the digital technique to a continuously increasing extent because of its reliability and exact functioning, and the storage possibilities as offered thereby. In radio and television receivers, e.g. for effecting the tuning to the desired receiving channels, previously set tuning voltages are used which, via electronic switches, can be optionally applied to variable-capacity (varactor) diodes. The electronic switches can be subjected to sequence control effected by electronic stepping switches. Remote-control circuits for television receivers are known to be likewise operated by a step-by-step sequence control for controlling the sound volume, the brightness and the color intensity, stepwisely in the upward and the downward direction. As regards step-by-step or sequence control, various points of view have to be taken into consideration. It would not make much sense to refine the digital control steps too far below the limit of distinguishing one step from the neighboring one.

Likewise, it is also not advisable, during the control process, to make the time too short for a reached step to be checked by the human sense of hearing, the eyes, or the human brain, and for the return indication to the motorial nerves which, for example, via a finger, have to terminate the keying of a remote-control circuit. The retention time on one reached step must reliably exceed the human reaction time.

It has proved to be suitable in practice that a retention time of at least .6 seconds must be chosen per step. Only with such a retention time duration it is reliably possible for the operating person to stop the control procedure on account of an indicated channel numeral. The same also applies to the sound volume, brightness, and color intensity steps.

Therefore, all sequence (sequential) control systems have the common disadvantage that a relatively long setting duration is to be expected as soon as a larger setting range has to be swept through. When using, for example, 16 steps for physiological control functions which otherwise have to be continuously set, such as the sound volume, brightness and color intensity, there will be required about 10 seconds for sweeping through the entire control range. This period of time is mostly considered as being too long.

It is the object of the invention, therefore, to avoid the aforementioned disadvantages of a digital sequence control system, and to provide a more rapid sequential setting possibility without diminishing the fineness of the individual steps, and in particular, the number of steps of the electronic control elements for effecting the ultrasonic remote control of television receivers is to be doubled without substantially increasing the setting time.

The invention, in particular, offers the advantage that with respect to conventional systems and circuits, the number of steps is increased to 2 ($n$-1), thus doubling the setting accuracy and yet practically maintaining the setting speed.

Figure 2:
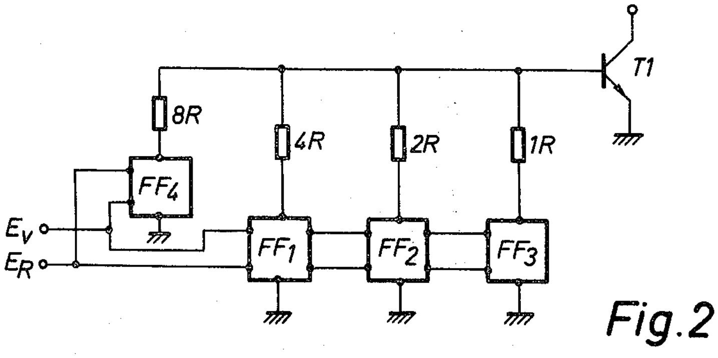
Figure 3:
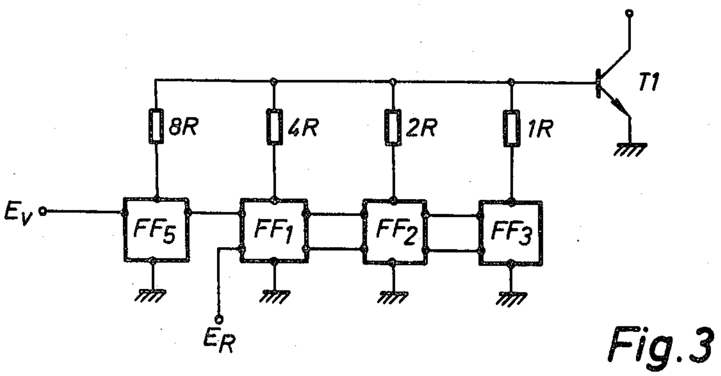

Examples of embodiment of the invention are shown in the copending drawing and will be described in greater detail hereinafter. In the drawings:

FIG. 1 shows the combination of an electronic step counter with a bistable electronic switch, by which the number of switchable outputs can be doubled, FIG. 2 shows the use of the interstage method for digital-to-analog converters, which are required as the elements for controlling operating functions, and FIG. 3 shows the practical embodiment of an asymmetrical step-control method according to which, in the one direction, there is effected a slower but finer control than in the other stepping direction.

The electronic stepping switch S1 in FIG. 1 can be controlled e.g. at its input E1, in such a way that in response to each positive pulse, a positive output voltage changes from the output A1 to A2, from A2 to A3 or from A3 to A4, with each time only one of the four outputs becoming positive while all others remaining at zero. The electronic stepping switch may operate cyclically, so that a positive pulse at E1 will cause the positive output voltage to change from A4 to A1, or that a positive pulse at E2 will cause the positive output voltage to change from A1 to A4. In cases where electronic traps are incorporated, as is customary in the case of the operating functions serving to control the sound volume, the brightness and the color intensity, the aforementioned cyclical operations are not possible. The forward and backward control between A1 and A4, in these cases, is each time only possible by reversing the stepping direction.

In parallel with E1 there is arranged E3, i.e. the input of the bistable electronic switch S2 which, by a positive pulse applied thereto, is switched to the positive position at the output A5, irrespectively of how many positive pulses arrive at E3.

In parallel with E2 there is arranged E4, i.e. the second input of the bistable electronic switch S2, at which the output A5 is set to zero, irrespectively of how many positive pulses arrive at E4.

The AND-gates G1 to G8 are subdivided into four groups, i.e. in such a way that each time two sucessively following gates are connected in common with one input to one of the outputs of the electronic stepping switch A1 to A4. Each time one input of the four groups is directly applied to A5, i.e. the output of the electronic switch S2, while the last input of each of the four groups is applied to A5 via the inverter I1.

As is well known, a positive signal will only appear at the output of each AND-gate when both of its inputs become positive, so that the following combinations will result:

1. In the case of forward steps (positive pulses at E1) the following outputs are rendered positive one at a time in turn:

$$A_{G1} \quad A_{G3} \quad A_{G5} \quad A_{G7}$$

2. In the case of backward steps (positive pulses at E2):

$$A_{G2} \quad A_{G4} \quad A_{G6} \quad A_{G8}$$

This, however, only applies to cyclical circuits of the electronic stepping switch. In cases where electronic limit stops are provided, A4 can only be switched to become positive via E1, and A1 can only be switched to become positive via E2.

Two of these combination possibilities, e.g. $G_1$ and $G_8$ appear to be superfluous in this case; there is only reached a total of six outputs.

The electronic stepping switch may also be a device for effecting the electronic pushbutton selection with several bistable electronic switches being arranged in such a way that the output of the respective switched-on bistable electronic switch is connected to the input of the successively following switched-off electronic switch, via a capacitory, so that the capacitor is discharged and transfers its charging current pulse, upon switching off the previously switched-on electronic switch, to the input of the successively following one, for switching it on and in the course of which all of the bistable electronic switches are capable of being switched off simultaneously via one control input provided in common to all.

For the backward control of the electronic stepping switch there may also be provided a (*n*-1)-burst signal in such a way that the steps in one direction are formed successively by forward counting pulses at the counter input of a digital counting circuit or digital information storage, and are set back via the same counter input in the same direction (cycle) by a burst of (n-1) pulses by each time one step, with n being the total number of counting steps of one complete counting cycle. In further embodying the invention, as shown in the embodiment of FIG. 1, and described hereinbefore, there will result from this a particularly simple solution. The electronic stepping switch has first and second signal inputs for the two stepping directions and n different outputs. The outputs are capable of being switched by the corresponding input signals successively in any direction. A bistable electronic switch has a first signal input serving to control a first switching position and a second signal input serving to control a second switching position. The first and second signal inputs are in parallel with the respective signal inputs of the electronic stepping switch. The output of the bistable electronic switch in connection with additional switch elements, is connected in such a way that in the one stepping direction *n* outputs and, in the other direction *n* or *n*-2 further outputs become successively switchable.

The step counters shown in the examples of embodiment according to FIGS. 1 to 3, may consist e.g. of flip-flop chains, shift registers, or ring counters.

FIG. 2 shows the example of a binary encoded digital-to-analog converter in which the counting flip-flops FF1 to FF3 are connected in series and supposed to comprise internal electronic limit stops. As the control element for any arbitrary function control there is used the transistor T1, at the base electrode of which the matrix resistors 1R, 2R, 4R may form altogether eight different conductance combinations for the base current. The values of the resistors are each time doubled. The additional resistor 8R has a resistance value which is double as high as that of 4R, and is switched by a further flip-flop FF4, with the forward and backward inputs of which being arranged in parallel with the common forward and backward inputs $E_V$ and ER of the counting flip-flops. Quite depending on the counting direction, the additional resistor 8R is either connected in parallel or disconnected, thus producing the desired intermediate steps for a certain (predetermined) counting direction. The number of steps including the intermediate steps is increased by the circuit from 8 to 14, hence six intermediate steps are added.

The path towards certain intermediate steps always extends via a reversal of the counting direction for respectively one backward and forward step. In this way all of the intermediate steps are reached substantially quicker than in the case of a normal step-by-step sequence control.

In its basic outline, the example of embodiment according to FIG. 3 corresponds to that of FIG. 2, but in the forward direction there is achieved a finer step-up distance, because flip-flop FF5 in combination with 8R only responds to the forward counting pulses whereas FF1 comprises the input for the backward counting pulses and only operates with 3 counting flip-flops instead of with 4 of them. From this there will result 16 forward steps and only 8 backward steps with the uncertainty of one counting step, because the backward counting may be effected independently of the circuit or switching state of FF4. Of course, in this case the backward steps are double steps.

A circuit of the type described hereinbefore may be of advantage, for example, in remote-control circuits effecting a backward counting with an (n-1)-burst, or else in circuits employing a common master clock also for purposes other than the program selection, and whose frequency rate may not be increased, and for the clock pulse rate of which, however, the physiological function controls would be too slow. In these cases an acceleration can be achieved at least in the one stepping direction with the aid of the circuit according to FIG. 3.

The stepping functions of the described examples of embodiment may be performed by (remote-control) signals triggered e.g. by wireless or wirebound keying. The stepping functions may also be subjected to either wireless or wirebound release, either directly or indirectly by the keying signals of a periodic start-stop pulse generator, with the start-stop pulse generator capable of being actuated by way of keying and connected directly to either the keying circuit or the electronic stepping switch.

The inventive system for controlling stepwisely in n steps the electronic control elements is not only suitable for being used in radio and television receivers, but may be employed equally well with other equipments in the fields of communications engineering, and with remote-control devices, computers, counters, measuring instruments and other test equipment, as well as with digital station-finding circuits.

What is claimed is:

1. A system for controlling the steps of an electronic control element in response to forward and backward pulse signals, comprising:

electronic step switch means having first and second inputs connected for receiving said forward and backward pulse signals respectively, said electronic step switch means being responsive to said forward and backward pulse signals for providing a stepped signal in increasing and decreasing step directions respectively, said stepped signal steps corresponding to alternate steps of the electronic control element;

electronic switch means responsive to at least one of said forward and backward pulse signals for providing an output signal;

means responsive to said stepped signal from the electronic step switch means and the output signal of the electronic switch means to provide a stepped output signal having steps corresponding to even steps of the electronic control element in one step direction and odd steps in the other step direction.

2. A system as described in claim 1, wherein the electronic switch means has first and second inputs connected in parallel with the first and second inputs of the electronic step switch.

3. A system as described in claim 1, wherein the means responsive to said stepped signal and the output signal comprises a plurality of gates each having a first and second input and an output corresponding to a step of the electronic control element, the outputs of an adjacent pair of gates correspond to an even and an odd step, the first of said inputs of adjacent pairs of gates being connected together to receive a stepped signal from the electronic step switch means and the second of said inputs being responsive to the output signal of the electronic switch means.

4. A system as described in claim 3, wherein the electronic switch means additionally comprises an inverter for receiving the output signal and providing an inverted output signal, said second inputs of the gate means being connected so that alterante gate means receive one of said output signal and inverted output signal.

5. A system as described in claim 1, wherein the electronic switch means comprises a bistable switch having first and second inputs connected in parallel with the first and second inputs of the electronic step switch and an inverter connected to provide an inverted output signal in addition to the output signal; and the means responsive to said stepped signal and said output signal comprises a plurality of gates each having a first and second input and output corresponding to a step of the electronic control element, the outputs of an adjacent pair of gates corresponding to an even and an odd step, the first of said inputs of adjacent pairs of gates being connected together to receive a step signal from the electronic step switch means and the second of said inputs connected so that alternate gates receive one of said output signal and inverted output signal.

6. A system as described in claim 1, wherein the electronic step switch is a binary encoded counter.

7. A system as described in claim 1, wherein the electronic stepping switch comprises a chain of binary counting flip-flops adapted to receive the forward and backward pulse signals at first and second inputs and the electronic switch means comprises a flip-flop having first and second inputs connected in parallel with the first and second inputs of the chain of binary counting flip-flops.

8. A system as described in claim 7, wherein the means responsive to said stepped signal and said output signal comprises a plurality of selected resistors connected to the flip-flop outputs for providing stepped voltage or current steps corresponding to the steps of the electronic control element.

9. A system as described in claim 8, wherein the flip-flop providing the output signal is connected so as to provide an output only in response to backward pulse signals.

10. A system as described in claim 8, wherein the flip-flop providing the output signal is connected so as to provide an output only in response to forward pulse signals.

11. A system as described in claim 1, wherein the electronic stepping switch comprises a chain of binary counting flip-flops having first and second inputs and the electronic switch means comprises an additional flip-flop having an input and an output connected to the first input of the chain of the binary counting flip-flops and another output providing the output signal, the second input of the chain of binary counting flip-flops being connected to receive one of said forward and backward pulse signals while the input of the additional flip-flop is connected to receive the other of the forward and backward pulse signals.

12. A system as described in claim 11, wherein the forward pulse signals are provided to the input of the additional flip-flop and the backward pulse signals are provided to the second input of the chain of binary counting flip-flops whereby the stepped output signal provides all steps of the electronic control element when stepping in the forward direction but provides only alternate steps when stepping in the backwards direction.

13. A system as described in claim 11, wherein the backward pulse signals are provided to the input of the additional flip-flop and the forward pulse signals are provided to the second input of the chain of binary counting flip-flops whereby the stepped output signal provides all steps of the electronic control element when stepping in the backward direction but provides only alternate steps when stepping in the forward direction.

14. A system as described in claim 11, wherein the means responsive to said stepped signal and said output signal comprises a plurality of selected resistors connected to the outputs of the flip-flops for providing stepped voltage or control signals corresponding to the steps of the electronic control element.

* * * * *